United States Patent [19]
Harrington

[11] 3,813,857
[45] June 4, 1974

[54] COTTON HARVESTER

[75] Inventor: Herbert A. Harrington, Cincinnati, Ohio

[73] Assignee: HMR Enterprises, Inc., Cincinnati, Ohio

[22] Filed: Oct. 12, 1972

[21] Appl. No.: 296,753

[52] U.S. Cl. .................................... 56/13.1, 56/30
[51] Int. Cl. .......................................... A01d 45/20
[58] Field of Search .......... 56/30, 31, 32, 13.1, 13.2

[56] References Cited
UNITED STATES PATENTS

| 830,102 | 9/1906 | Richmond | 56/13.1 |
|---|---|---|---|
| 1,646,594 | 10/1927 | Phelps et al. | 56/41 |
| 1,949,032 | 2/1934 | Wilson | 56/42 |
| 2,763,978 | 9/1956 | Graham et al. | 56/30 |
| 2,785,522 | 3/1957 | McKenzie | 56/31 |
| 2,798,351 | 7/1957 | Altemus | 56/13.2 |
| 3,058,282 | 10/1962 | Ganguet et al. | 56/13.1 |
| 3,137,114 | 6/1964 | Fergason | 56/42 |
| 3,144,744 | 8/1964 | Ganguet et al. | 56/31 |
| 3,323,296 | 6/1967 | Starkey | 56/42 |
| 3,349,550 | 10/1967 | Starkey | 56/42 |

Primary Examiner—Russell R. Kinsey
Attorney, Agent, or Firm—John W. Melville; Albert E. Strasser; Stanley H. Foster

[57] ABSTRACT

A pneumatic apparatus for picking cotton and the like comprising a spaced pair of vertical panels adapted to lie on either side of a cotton plant in a row thereof; each of the panels having a plurality of cotton intake openings therein. The apparatus includes a pump of suitable type having a plurality of inlet ports and a plurality of outlet ports. Means are provided for connecting the cotton intake openings in the vertical panels to the inlet ports of the pump and additional means are provided for connecting the outlet ports of the pump to a cotton receiving and storing means. The pump operates in such a way as to produce alternate vacuum and pressure pulses having an air velocity of from one half the speed of sound to the speed of sound through the intake openings and inlet ports. The momentary vacuum pulses will cause cotton to be extracted from the plant and to be conducted to the pump through the intake openings in the panels and through the inlet ports in the pump. The pressure pulses will cause the cotton to pass from the pump, through the outlet ports therein, to the cotton storage and receiving means. Means are also provided for moving the assembly along a row of cotton plants. Further means may be provided to support the cotton plants in a substantially upright position during the picking operation.

31 Claims, 9 Drawing Figures

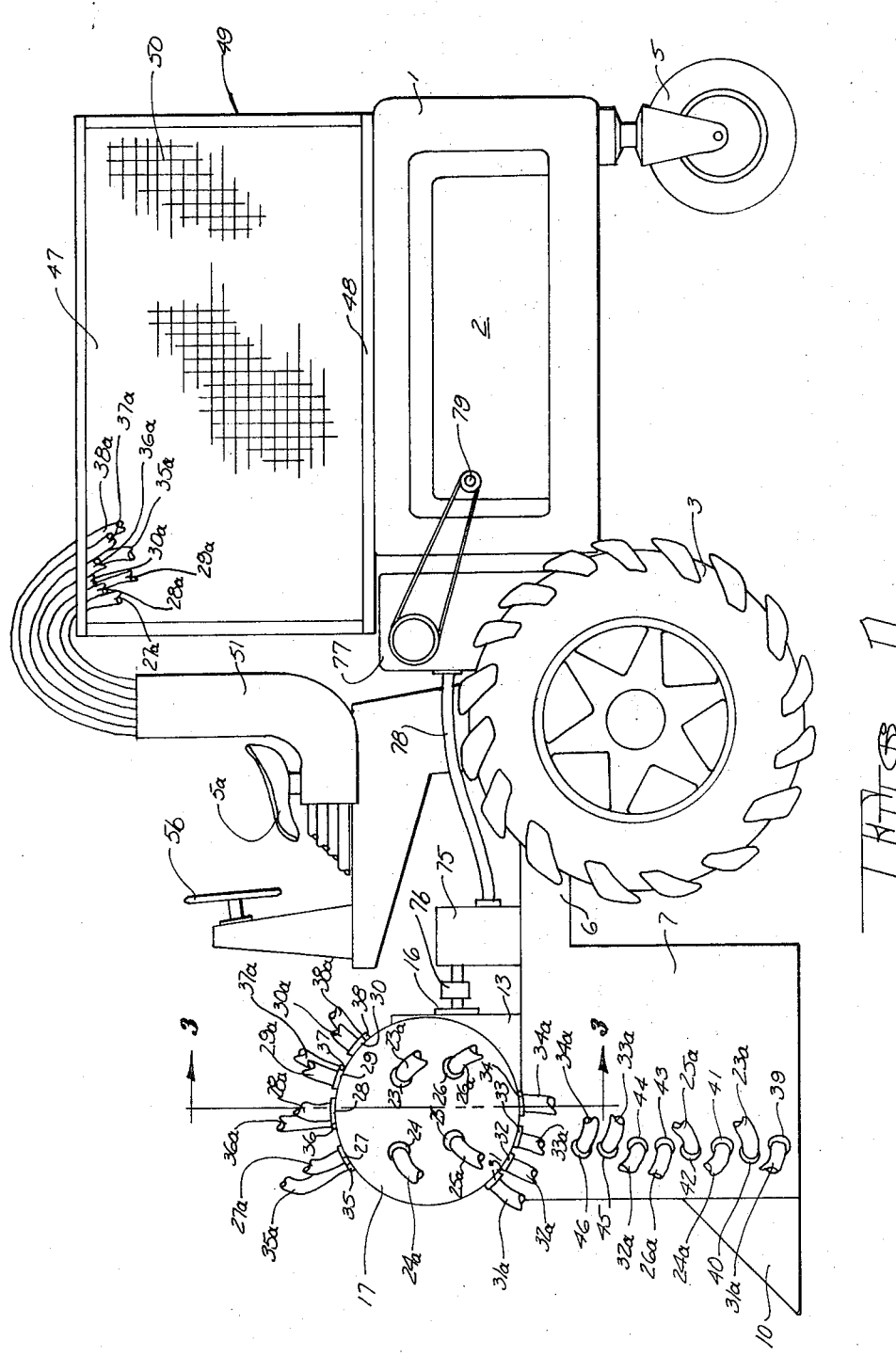

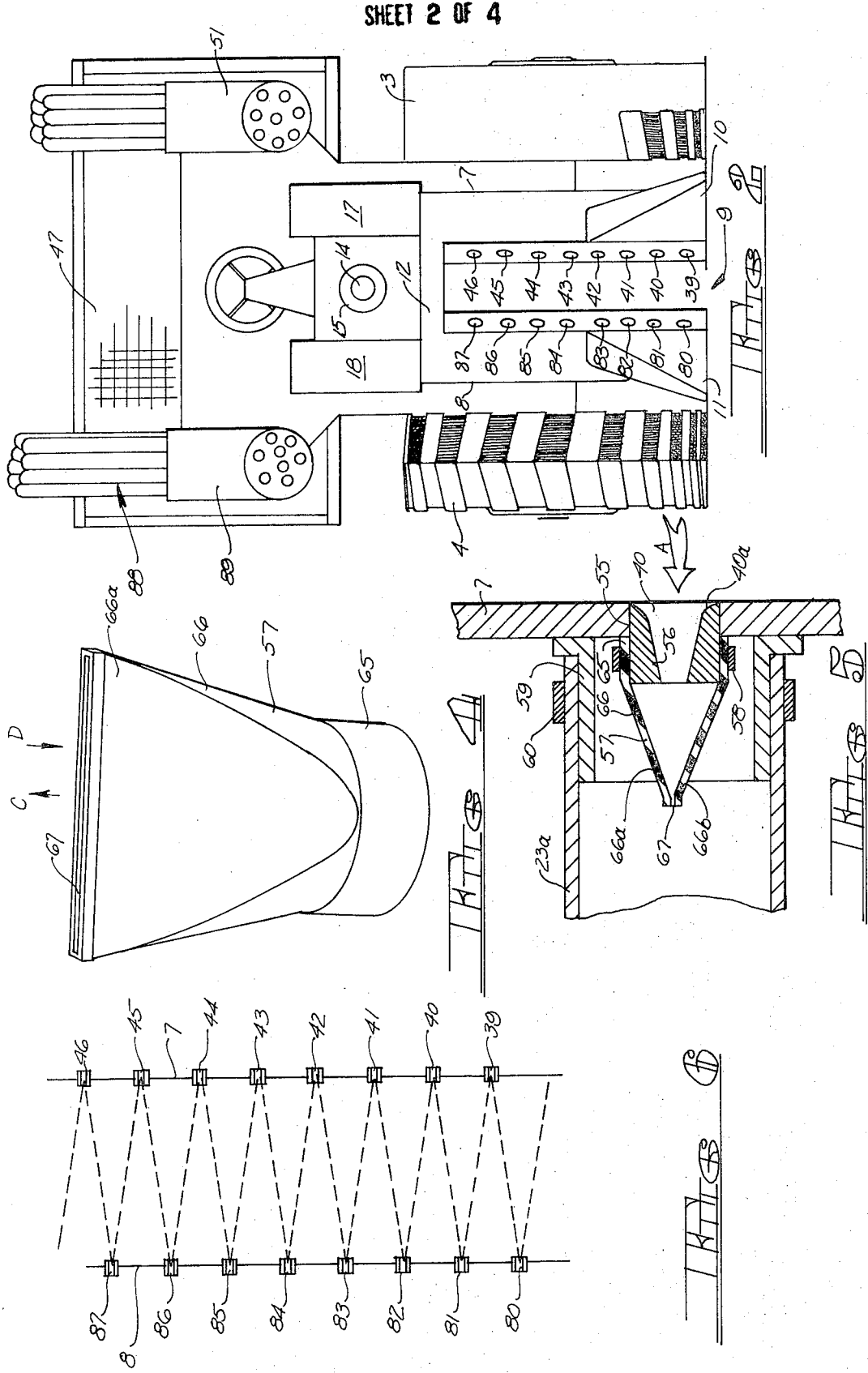

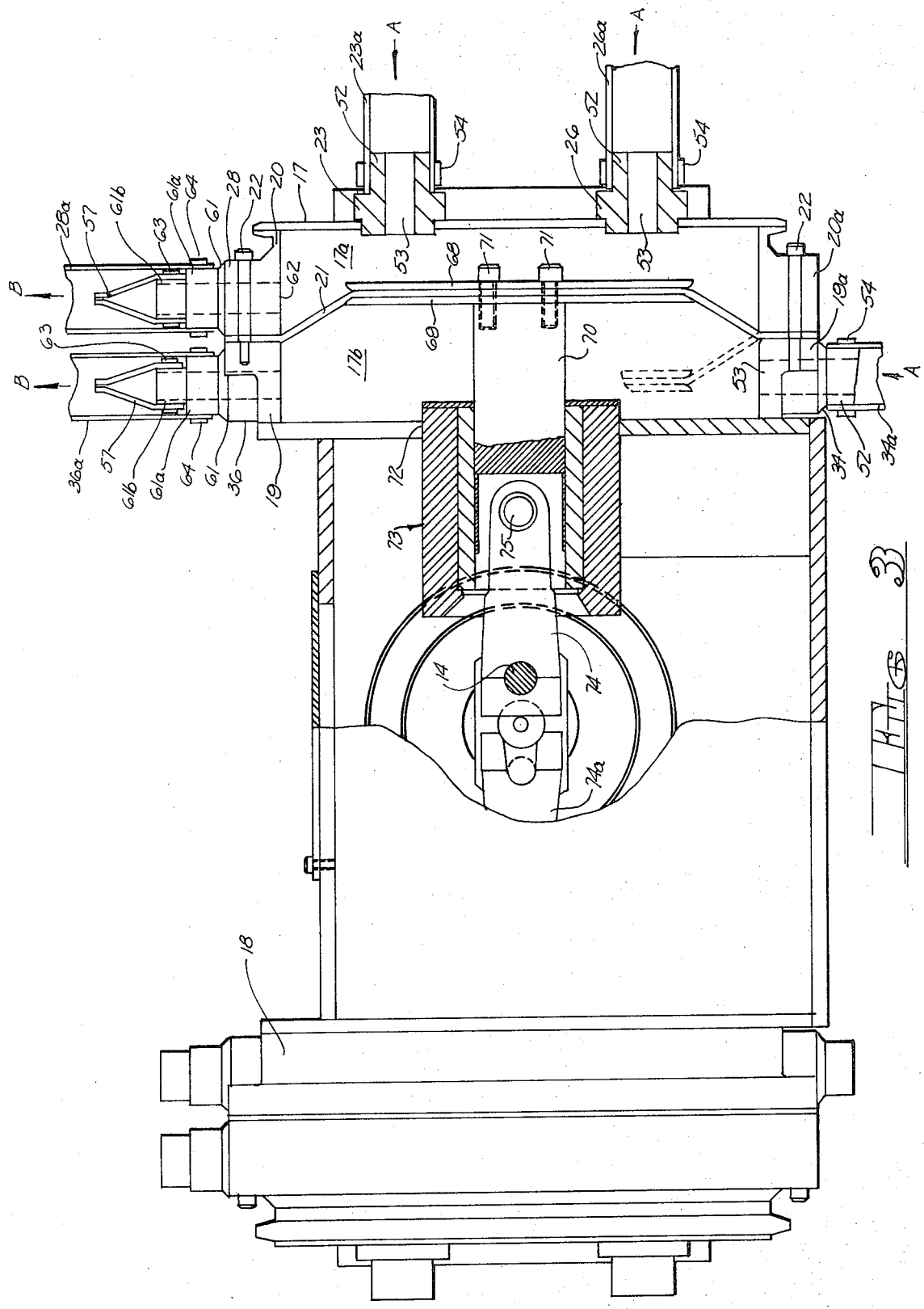

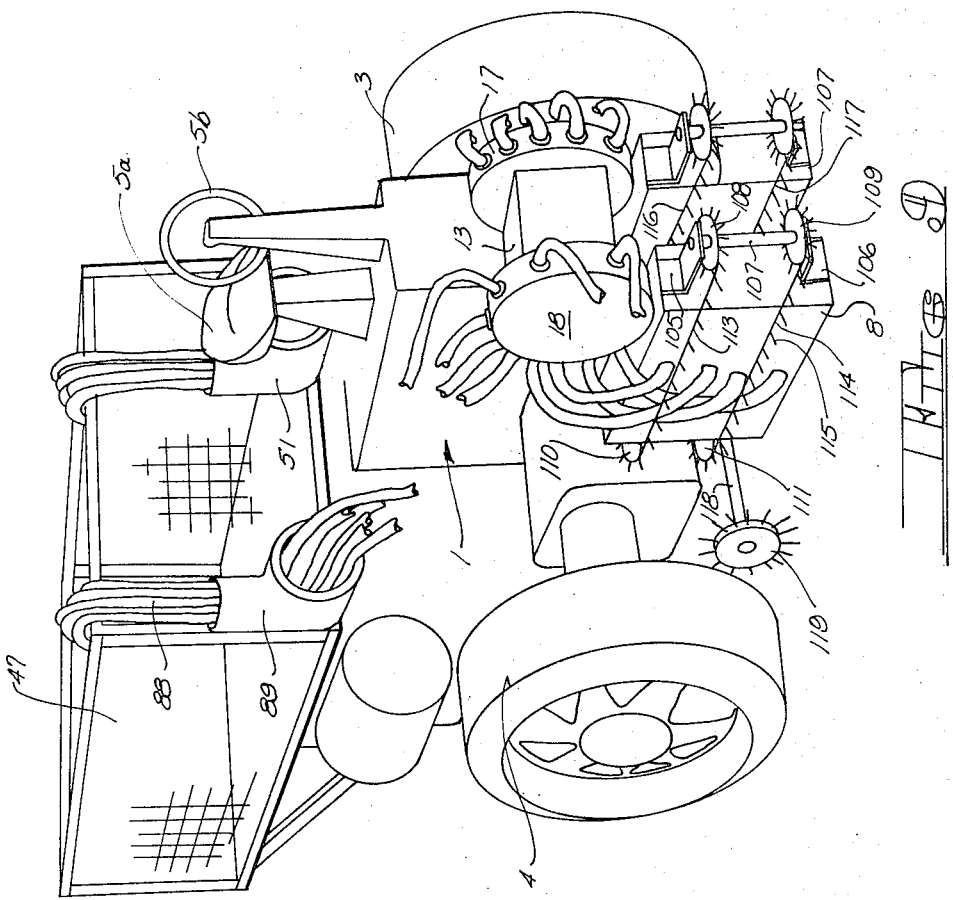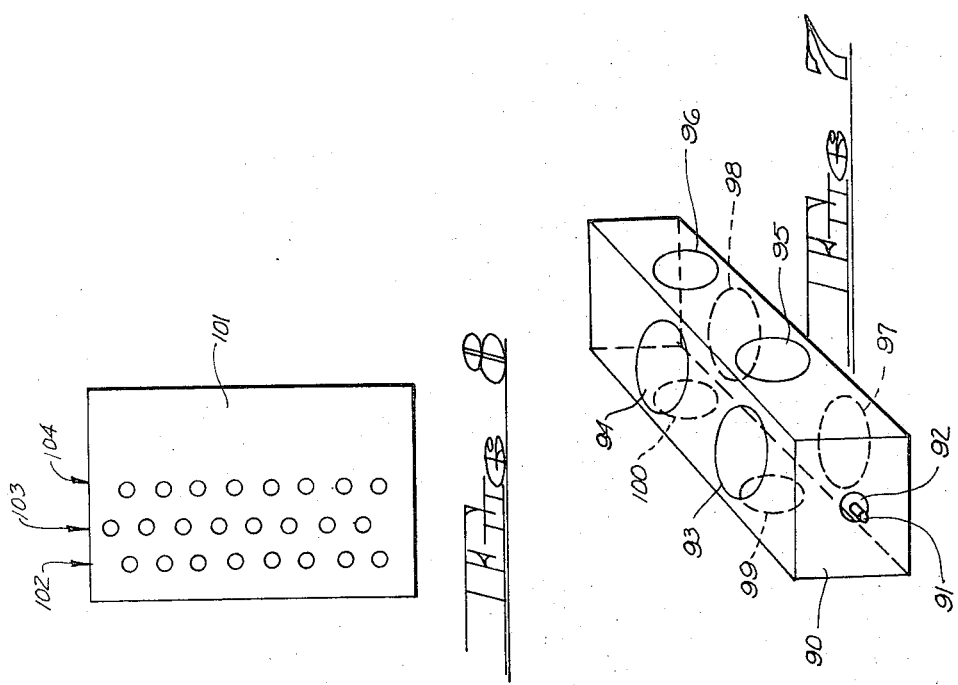

COTTON HARVESTER

BACKGROUND OF THE INVENTION

1. Field of the Invention

The invention relates to a farm implement, and more particularly to an automatic cotton harvesting device.

2. Description of the Prior Art

Historically, cotton has been harvested by hand. While hand harvesting results in high grade yield with a minimum amount of foreign material, it is time consuming and obtaining sufficient personnel for the task has long been a problem.

Over the past one hundred years, many automatic cotton picking harvesting devices have been developed, which fall generally into three categories: mechanical harvesters, vacuum harvesters, and intermittent vacuum harvesters. Of these, mechanical harvesters are generally costly, complex and result in the production of cotton of an inferior quality. This is true because they have a tendency to sweep the field, picking up a considerable amount of dirt, broken branches, weed seeds and finely divided foreign material. In general, it is necessary to defoliate the cotton plants prior to the operation of a mechanical harvester. The complexity of mechanical harvesters is frequently such as to result in maintenance problems and high maintenance costs. Finally, such devices are usually slow in operation and have a low capacity rate.

Continuous vacuum harvesting devices utilize fans, blowers, centrifugal means and the like, and are generally not successful in loosening the cotton from the plant without the aid of additional mechanical contrivances, pressure blasts or the like. Thus, continuous vacuum harvesters are characterized by the requirement of maintaining a high vacuum and have a low efficiency. When they are sufficiently powerful to remove the cotton from the plant, they generally pick up foreign material as well and cause considerable damage to the cotton plant, thus impairing the economy of the cotton field.

Intermittent vacuum harvesting devices, utilizing one or more cylinders for creating alternate vacuum and pressure pulses, have also been complex in nature and generally have required a number of field hands, each carrying a flexible cotton extracting hose or tube.

The present invention is directed to a fully automatic intermittent vacuum-type cotton harvesting device which may be manufactured as a part of a self-propelled vehicle or which may be affixed to a pre-existing vehicle. The device of the present invention is adapted to provide a series of intermittent vacuum pulses of such high magnitude and of such short duration that cotton tufts are drawn from their plants without attracting high density objects such as twigs, dirt, or the like, thus producing a high grade yield. The device is rapid and efficient in operation and will not damage the cotton plants. In view of the fact that it has fewer parts, it is easier and less expensive to manufacture and maintain than is the typical mechanical cotton harvester.

SUMMARY OF THE INVENTION

The cotton harvester of the present invention may be provided as a part of a self-propelled vehicle, or it may be affixed to a pre-existing vehicle. In one exemplary embodiment, the device comprises a pair of spaced vertical panels hingedly affixed to a vehicle and adapted to lie on either side of the cotton plants of a given row, as the vehicle passes down the row. The panels each have a plurality of cotton intake ports suitably arranged therein.

The pump of the cotton harvester of the present invention may take various forms including piston types, piston with rolling diaphragm types and slack diaphragm types. For purposes of an exemplary showing the pump will be described as comprising a pair of diaphragm chambers affixed to either side of a housing containing a crank shaft. Flexible diaphragms within the chambers are operatively connected to the crank shaft whereby the diaphragms are flexed so as to produce alternate vacuum and pressure pulses having an air velocity of from about one half the speed of sound to about the speed of sound.

Each diaphragm chamber has a plurality of inlet ports on both sides of the diaphragm. The inlet ports are connected by suitable conduit means to the cotton intake openings in the vertical panels.

Each diaphragm chamber has a plurality of outlet ports on both sides of its diaphragm, which outlet ports are connected by suitable conduit means to a cotton receiving and storage means.

When the diaphragms produce a vacuum pulse, cotton will be drawn from the plants through the panel intake openings and into the diaphragm chambers through the inlet ports therein. When the diaphragms produce a pressure pulse, cotton will be ejected through the diaphragm chamber outlet ports to the cotton storage and receiving means.

In another embodiment, the number of diaphragm chambers may be increased, together with the number of cotton intake openings in the vertical panels. In such an instance, a plurality of diaphragm chambers may be arranged in an appropriate array about the crank shaft, each diaphragm being operatively connected thereto. In all other respects, the device will be substantially the same as the first described embodiment.

Means may also be provided to maintain the cotton plants in upright position during the picking operation. These means may take various forms, as will be described hereinafter.

BRIEF DESCRIPTION OF THE DRAWINGS

FIG. 1 is a semi-diagrammatic, side elevational view (with parts fragmentarily indicated) of a vehicle provided with the cotton harvesting device of the present invention.

FIG. 2 is a semi-diagrammatic, front elevational view (with parts fragmentarily indicated) of the vehicle of FIG. 1.

FIG. 3 is a fragmentary view partially in cross section taken along the second line 3—3 of FIG. 1.

FIG. 4 is a perspective view of a valve of the present invention.

FIG. 5 is a fragmentary cross sectional view illustrating a typical intake opening in the vertical panels.

FIG. 6 is a diagrammatic representation of an exemplary placement of the intake openings in the vertical panels.

FIG. 7 is a semi-diagrammatic, perspective view of the crank shaft housing having an array of diaphragm chambers thereabout.

FIG. 8 is an elevational view of a panel having three rows of intake openings staggered with respect to each other.

FIG. 9 is a semi-diagrammatic perspective view of a vehicle provided with the cotton harvesting device of the present invention including means to maintain the cotton plants upright during the picking operation.

DESCRIPTION OF THE PREFERRED EMBODIMENTS

FIGS. 1 and 2 are semi-diagrammatic representations of a self-propelled vehicle provided with the cotton harvesting device of the present invention. It will be understood by one skilled in the art that the nature of the vehicle itself does not constitute a limitation on the present invention. For example, a vehicle may be specially designed to propel the cotton harvesting device or a pre-existing farm vehicle may be modified to do so. For purposes of an exemplary showing, FIGS. 1 and 2 illustrate a vehicle 1 comprising a slightly modified farm tractor having an engine 2, two large driven wheels 3 and 4 and one steerable wheel 5. In this instance, the vehicle operator 5a has been reversed in direction, as has the steering wheel 5b. AS a consequence, the driven wheels 3 and 4 represent the front of the machine, while the steerable wheel 5 represents the rear of the vehicle.

A frame 6 is pivotally affixed to the forward end of the machine. The frame 6 supports a pair of downwardly depending, spaced panels 7 and 8. The panels 7 and 8 extend nearly to the ground and form a slightly tapered passage (generally indicated at 9) therebetween, through which the cotton plants will pass as the vehicle moves along a row thereof. The forward ends of the panels 7 and 8 may be provided with triangular guide means 10 and 11 to aid in directing the cotton plants into the passage 9. The guide means 10 and 11 may support conventional wire-like plant lifters (not shown). The tapered passage 9 is so sized as to slightly compress the cotton plants as they pass therethrough. This compression of the cotton plants should not be sufficient to damage them. To this end the panels 7 and 8 may be adjustably supported so that the distance therebetween (and thus the passage 9) may be varied. In addition the panels 7 and 8 may be resiliently mounted so that they may shift slightly away from each other to accommodate the passage of particularly large cotton plants therebetween.

It will be understood by one skilled in the art that the wheels of the vehicle will travel in the space between a row of cotton plants passing through the passage 9 and the adjacent rows of cotton plants to the right and left thereof. It is within the scope of the invention to provide hydraulic means (not shown) to raise and lower the pivoted frame 6 and depending panels 7 and 8, to adjust the distance between the panel bottoms and the ground and to accommodate unevenness in the ground level.

The frame 6 includes a portion 12 extending between the panes 7 and 8. Mounted on the portion 12 is a crank shaft housing 13 containing a crank shaft 14 mounted in bearing means 15 and 16 in the forward and rearward ends of the housing 13, respectively. As will be more fully described hereinafter, the crank shaft 14 is operatively connected to flexible diaphragms located in diaphragm chambers 17 and 18, affixed to the sides of the crank shank housing 13.

Since the diaphragm chambers 17 and 18 are substantially identical, it will be necessary to describe only one of them in detail. Reference is made to FIGS. 1 and 3 wherein diaphragm chamber 17 is clearly shown. The diaphragm chamber has annular flange portions 19a and 20a, respectively. A circular flexible diaphragm 21 is located between the halves, with its peripheral edge lying between the annular flanges 19a and 20a. The chamber is assembled by a plurality of bolts (two of which are shown at 22), extending through the flanges 19a and 20a and the peripheral edge of the diaphragm located therebetween. Thus, the chamber halves 19 and 20 are joined in air-tight fashion.

From FIG. 3, it will be evident that the diaphragm 21 divides the chamber 17 into two portions 17a and 17b. The portion 17a is defined by the diaphragm 21 and the diaphragm chamber half 20. The portion 17b is similarly defined by the diaphragm 21 and the diaphragm chamber half 19.

As shown in FIG. 1 the diaphragm chamber half 20 has four inlet ports 23 through 26 and four outlet ports 27 through 30. Similarly, diaphragm chamber half 19 has four inlet ports 31 through 34 and four outlet ports 35 and through 38.

Referring to FIGS. 1 and 2 it will be noted that the vertical panel 7 has a row of cotton intake openings 39 through 46. The inlet ports 23 through 26 in the half 20 of diaphragm chamber 17 are connected respectively to the cotton intake openings 40 through 43 by flexible hose or conduit means 23a through 26a. Similarly, the inlet ports 31 through 34 in the half 19 of diaphragm chamber 17 are connected to intake openings 39 and 44 through 46, respectively, by flexible hose or conduit means 31a through 34a.

The outlet ports 27 through 30 of half 20 of diaphragm chamber 17 are connected by flexible hose or conduit means 27a through 30a, respectively, to a cotton receiving and storage bin 47. The bin 47 may take any suitable form. For purposes of an exemplary showing it is illustrated as comprising a rectangular floor 48 to which a framework (generally indicated at 49) is affixed. The sides and ends of the bin comprise open mesh screening 50 or the like supported by the framework 49. The openings in the sides and ends of the bin are sufficiently small to retain the cotton deposited in the bin.

In similar fashion, the outlet ports 35 through 38 in diaphragm chamber half 19 are also connected by flexible hose or conduit means 35a through 38a to the bin 47. The flexible hose or conduit means 27a through 30a and 35a through 38a may be cause to pass through a hollow guide means 51. The guide means 51 supports and properly orients these outlet hoses and is, itself, appropriately affixed to the vehicle 1.

The inlet port 23 in the diaphragm chamber half 20 is clearly shown in FIG. 3. The inlet port 23 comprises a cylindrical fitting 52 having a central opening or passage 53. The fitting 52 may be affixed to the chamber half 20 in any suitable manner including threading, welding, bolting or the like. The fitting 52 has an outwardly extending cylindrical portion adapted to receive the end of the flexible hose or conduit 23a. The flexible hose or conduit is attached to the fitting by any suitable means such as a clamping ring 54.

It will be understood that the remaining inlet ports 24 through 26 in the diaphragm chamber half 20 and the inlet ports 31 through 34 in the diaphragm chamber half 19 will be similarly constructed and their respective flexible conduit or hose means will be similarly attached. To illustrate this, FIG. 3 also shows inlet port 26 in diaphragm chamber half 20 and inlet port 34 in diaphragm chamber half 19. With respect to these inlet ports, like parts have been given like index numerals.

FIG. 5 is a fragmentary view illustrating that portion of the vertical panel 7 containing intake opening 40 to which the inlet port 23 of diaphragm chamber half 20 is connected by flexible hose or conduit means 23a. As illustrated, the panel 7 has an opening 55 therein which may be provided with a fitting 56. The fitting 56 has a tapered opening therein constituting the intake opening 40, rounded at its outermost end (as at 40a). The tapered opening 40 provides a "Venturi" effect, so as to counteract head loss at the intake opening 40. That portion of the fitting 56 which extends beyond the opening 55 in the panel 7 is adapted to receive a valve 47. The valve may be held in place on the fitting 56 by any suitable means such as a clamping band or ring 58. As will be explained hereinafter, the purpose of valve 57 is to insure that air and cotton can pass through the intake opening 40 only in the direction of arrow A.

An additional fitting 59 is affixed in any suitable manner such as welding or the like to the vertical panel 7. The fitting 59 surrounds the fitting 56 and the valve 57. The fitting 59 is cylindrical in configuration and is adapted to receive the end of the flexible hose or conduit 23a. The conduit 23a is attached to the fitting 59 by any suitable means such as clamping ring 60.

It will be understood that the remaining intake openings 39 and 41 through 46 will be substantially identical to the intake opening 40 shown in FIG. 5 and the flexible hoses or conduits connecting them to the respective inlet ports in diaphragm halves 19 and 20 will be attached thereto in similar fashion. All of the cotton intake openings will be provided with valves 57, identical to that shown in FIG. 5. The valves 57 of all of the cotton intake openings 39 through 46 insure that cotton and air can pass through the cotton intake openings in the panel 7, their respective flexible hose or conduit means and the inlet ports in diaphragm chamber halves 19 and 20 only in the direction indicated by arrows A in FIGS. 3 and 5.

The outlet port 28 of diaphragm chamber half 20 (one of the four outlet ports 27 through 30) is shown in FIG. 3. The outlet ports 28 comprises a fitting 61 welded, threaded, bolted or otherwise affixed to a peripheral portion of the diaphragm chamber half 20. The fitting 61 has a central opening or perforation 62. The forward end of the fitting 61 has a first cylindrical portion 61a and a second cylindrical portion 61b. The second cylindrical portion 61b is of smaller diameter than the cylindrical portion 61a. A valve 57, identical to the valve 57 of FIG. 5, is affixed to the cylindrical portion 61b by any suitable means such as a clamping ring 63. The flexible hose or conduit 28a which connects the outlet opening 28 to the bin 47 is attached to the cylindrical portion 61a by any suitable means such as clamping ring 64. It will be understood that all of the remaining outlet ports 27, 29 and 30 of diaphragm half 20 and all of the outlet ports 35 through 38 of diaphragm chamber half 19 will be identical, having identical valves 57 and having their respective flexible hose or conduit means attached thereto in similar fashion. To this end, outlet port 36 in diaphragm chamber half 19 is shown in FIG. 3, together with a valve 57 and the flexible hose or conduit 36a. The remaining parts of outlet port 36 have been given like index numerals. The valves 57 in the outlet ports of the diaphragm chamber are so oriented as to assure that air and cotton from both halves 17a and 17b of the diaphragm chamber can exit therefrom only in the direction of arrows B (i.e., only through their respective flexible hose or conduit means to the bin 47).

FIG. 4 is a perspective view illustrating one of the valves 57. It will be noted that the valve comprises a resilient member having bottom cylindrical portion 65 and an upper flaring portion 66 with a pair of diametrically opposed flats, one of which is shown at 66a in FIG. 4 and both of which are shown at 66a and 66b in FIG. 5. The upper portion 66 terminates in a thin opening 67. The entire valve 57 is made of flexible material such that air and cotton can pass through the opening 67 in the direction of arrow C (FIG. 4) but neither air nor cotton can pass through the opening 67 in the direction of arrow D.

Thus, when air and cotton are blown through valve 57 in the direction of arrow C, the upper portion 66 of the valve will deform causing the opening 67 to enlarge. On the other hand, when the valve 57 is subjected to a vacuum, tending to draw air and cotton through the opening 67 in the direction of arrow D, the opening 67 will close, thereby preventing such an occurrence.

While the material from which the valves 57 are made does not constitute a limitation on the present invention, the material must be durable and tear resistant. Furthermore, the material must be such that the valves are capable of opening and closing rapidly, capable of millions of such cycles and capable of rapidly restoring themselves to their closed position. Excellent results have been achieved using a urethane elastomer.

The operation of the device depends upon the movement of the diaphragm 21 so as to create alternate vacuum and pressure pulses in each half of the diaphragm chamber 17 (see FIG. 3). In order to accomplish this, circular stiffening plates 68 and 69 are provided on either side of the diaphragm 21. At the center of the diaphram and the stiffening plates there is a laterally extending rod 70. The rod 70 is affixed to the diaphragm and stiffening plates in any suitable manner. For example, the rod 70 may have two or more threaded perforations therein adapted to receive bolts passing through matching perforations in the stiffening plates 68 and 69 and the diaphragm 21. Two such bolts are shown at 71.

The wall of the diaphragm chamber half 19 has a perforation 72 therein. An air-tight bearing and support means (generally indicated at 73) is affixed within the perforation 72. The rod 70 is slidable mounted in the bearing and support means 73. The air-tight bearing and support means may be of any suitable, well known type and will appropriately support and guide the rod 70 during its reciprocating action to be described hereinafter.

The end of the rod 70, opposite the diaphragm 21, is pivotally affixed to a link 74 by a pin 75. The link 74, in turn, is rotatably mounted on the crank shaft 14. It will thus be understood that rotation of the crank shaft 14 will, through the agency of link 74 and rod 70, cause the diaphragm 21 to be moved between its righthandmost position (the position in which it is shown in FIGS. 3) and its left-handmost position (fragmentarily indicated in dotted lines in FIG. 3).

Upon movement to the right in FIG. 3, it will be understood that a vacuum pulse will be produced in the chamber half 17b and a pressure pulse will be produced in the chamber half 17a. When a vacuum pulse is produced in the chamber 17b, cotton will be drawn through the cotton intake openings 39 and 44 through 46 in the vertical panel 7 and will pass through the flexible hoses or conduits 31a through 34a and inlet ports 31 through 34 into the diaphragm chamber half 17b. Air will be prevented from passing through the outlet ports 35 through 38 by virtue of the valves 57 therein.

At the same time, the pressure pulse produced in diaphragm chamber half 17a will cause cotton therein to be expelled through outlet ports 27 through 30 and flexible hose or conduit means 27a through 30a to the storage bin 47. At the same time, air will be prevented from passing through cotton intake openings 40 through 43 and the inlet ports 23 through 26 of diaphragm chamber half 17a by virtue of the valves 57 in association with the last mentioned cotton intake openings.

When the diaphragm is moved to its left-handmost position in FIG. 3, a pressure pulse is produced in diaphragm chamber half 17b and a vacuum pulse is produced in diaphragm chamber half 17a. Under these circumstances, air is prevented from passing through cotton intake openings 39 and 44 through 46 (as well as inlet ports 31 through 34 in diaphragm chamber half 17b) by virtue of the valves 57 in association with the cotton intake openings 39 and 44 through 46. On the other hand, cotton within the diaphragm chamber half 17b will be expelled through outlet ports 35 through 38 therein and will pass to the bin 47 via the flexible hose or conduit means 35a through 38a. Simultaneously, the vacuum produced in diaphragm chamber half 17a will cause cotton to be drawn through the cotton intake openings 40 through 43 in the vertical panel 7, through conduits 23a through 26a and through inlet ports 23 through 26 to the diaphragm chamber half 17a. On the other hand, air will not pass through outlet ports 27 through 30 in diaphragm chamber half 17a, by virtue of the valves 57 in association therewith.

From this description of the exemplary embodiment, it will be noted that both sides of the diaphragm are "worked." Thus, in one position of the diaphragm, chamber half 17a will have cotton drawn into it and chamber half 17b will have cotton expelled from it. In the other position of the diaphragm, chamber half 17a will have cotton expelled from it while chamber half 17b will have cotton drawn into it.

The crank shaft 14 may be caused to turn by any suitable means, including its own separate prime mover, where desired. For purposes of an exemplary showing, the end of the crank shaft 14 extending through the bearing 16 is shown as being attached to the shaft of a hydraulic motor 75 by any suitable coupling means 76 (see FIG. 1). The hydraulic motor 75 is powered by a hydraulic pump 77 connected thereto by appropriate conduit means, one of which is shown at 78. The pump 77, in turn, is driven by a typical power take-off means on the vehicle 1. This power take-off means is diagrammatically represented at 79.

While the dimensions of the various parts thus far described do not constitute a limitation on the present invention, it will be understood by one skilled in the art that the effective area of the intake openings in the vertical panel 7 will be a function of the size of the diaphragm 21 and its velocity. To effectively remove cotton from its plant, it has been found that the vacuum pulses in the chamber halves 17a and 17b should be such as to create air velocity of from one-half the speed of sound to the speed of sound. Furthermore, the total free area of the outlet ports in each diaphragm chamber half 17a and 17b should be equal to, or preferably greater than, the total free area of the intake ports of each diaphragm chamber half. This is true because otherwise the damping effect of trapped air within one of the diaphragm chamber halves would reduce the efficiency of the vacuum pulse (i.e., the picking cycle) of the other diaphragm chamber half.

As indicated above, the diaphragm chamber 18 (FIGS. 2, 3 and 9) is in every way identical to the diaphragm chamber 17. The chamber 18 will be divided into two portions each having a series of inlet ports and a series of outlet ports. The inlet ports of diaphragm chamber 18 will be connected by suitable flexible hose or conduit means to cotton intake openings 80 through 86 (see FIG. 2) in vertical panel 8. The various outlet ports of the diaphragm chamber 18 will be connected to the bin 47 by a plurality of flexible hose or conduit means (generally indicated at 88 in FIG. 2) passing through a guide means 89, similar to the guide means 51. It will be understood that the diaphragm of diaphragm chamber 18 will be operatively connected to the crank shaft 14 in the same manner described with respect to the diaphragm of chamber 17. To this end, a link means 74a for the diaphragm of chamber 18 is shown in FIG. 3. Thus, cotton will be picked from both sides of the plant as it passes through the passage 9 between the vertical panels 7 and 8.

It will be understood that the number and arrangement of cotton intake openings in the vertical panels 7 and 8 may be varied as desired. For example, the openings in each panel may be oriented in a vertical row (as shown in FIG. 2) and the rows may be offset with respect to each other. It is also within the scope of the invention to arrange the openings in each panel in more than one vertical row.

FIG. 6, for example, diagrammatically illustrates one arrangement for the cotton intake openings. It will be noted that the openings 39 through 46 in panel 7 and the openings 80 through 87 in panel 8 are located in diametrically opposed vertical rows. However, the openings themselves are not diametrically opposed, but are staggered so as to operate in complementary conical areas.

It is also within the scope of the invention to have one or more of the lowermost openings in each panel configured to be directed downwardly (not shown) so that cotton which has fallen to the ground may be retrieved.

As indicated above, the number and placement of the cotton intake openings in the vertical panels 7 and 8 may be varied as desired. Since the effective nozzle area has a fixed relationship to the diaphragm area and the velocity of the diaphragm, it may be necessary to increase the number of diaphragm chambers if the number of cotton intake openings is to be increased.

This may readily be accomplished by simply adding additional diaphragm chambers, all of which may be driven by the same crank shaft. For purposes of an exemplary showing, FIG. 7 illustrates diagrammatically a crank shaft housing having an array of diaphragm chambers affixed thereto. In FIG. 7, the crank shaft housing 90 is similar to the housing 13 of FIG. 2, except that it is elongated. The housing contains an elongated crank shaft 91 mounted in suitable bearings, one of which is shown at 92. In this instance, two diaphragm chambers are mounted on each of the four sides of the housing 90. These diaphragm chambers are indicated at 93 through 100. The diaphragm chambers may be substantially identical to those described with respect to FIG. 3. Each diaphragm chamber will be operatively connected to the crank shaft 91 and should be located along its respective wall of the housing 90 in such a position that the crank shaft may be balanced. This will insure that a minimum amount of vibration will be produced by rotation of the crank shaft.

FIG. 8 is a semi-diagrammatic elevational view of a vertical panel 101 equivalent to the panel 8 of FIG. 2. As indicated above, the number of rows of cotton intake openings may be increased so long as one or more diaphragm chambers per vertical panel are present to provide an adequate intake or vacuum pulse for the cotton intake openings.

For purposes of an exemplary showing, FIG. 8 illustrates three vertical rows of cotton intake openings. The vertical rows are generally indicated at 102, 103 and 104. It will be remembered that FIG. 6 shows that the intake openings of the panels 7 and 8 may be staggered with respect to each other to give a more complete picking coverage. FIG. 8 further illustrates that when a given vertical panel is provided with more than one row of cotton intake openings, the openings of the rows may be staggered with respect to each other. This further insures that the entire cotton plant will be exposed to the vacuum pulses.

The ease with which cotton can be removed from its plant varies and depends upon a number of factors. As a consequence, under some circumstances it may be desirable to subject each plant to up to three vacuum pulses. This can be accomplished by appropriately regulating the speed of the vehicle, or by providing an appropriate arrangement of cotton intake openings in panels 7 and 8, or both.

It is within the scope of the present invention to provide the cotton harvester with means for maintaining the cotton plants in an upright position as they pass between the vertical panels 7 and 8. To this end, a number of expedients may be used. For example, rotating brushes may be mounted immediately ahead of the panels 7 and 8 to gently engage and maintain each cotton plant in its upright position. Similarly, the panels 7 and 8 may be provided with horizontally oriented moving belts to assist the cotton plant during its passage between the panels.

FIG. 9 is a perspective view of the cotton harvester of the present invention illustrating yet another means by which the cotton plants may be maintained vertical during their passage between panels 7 and 8. To this end, the forward edge of panel 8 is illustrated as having a pair of brackets 105 and 106 mounted thereon. The brackets rotatively support a vertically oriented shaft 107 carrying a pair of sprocket wheels 108 and 109. A similar arrangement is affixed to the trailing edge of panel 8 and supports sprockets 110 and 111. A roller chain or the like 113 is supported by sprockets 108 and 110. A similar roller chain 114 is supported by sprockets 109 and 111. The roller chains 113 and 114 pass around the vertical panel 8. Each of the roller chains 113 and 114 carry laterally extending spindles 115. It will be noted that FIG. 9 shows panel 7 similarly provided with spindle carrying roller chains 116 and 117. The spindles of chains 113, 114, 116 and 117 are adapted to engage the cotton plant and maintain it upright during its passage between panels 7 and 8.

It is important that the chains 113, 114, 116 and 117 may be moved at a speed synchronized with the ground speed of the cotton harvester. This may be accomplished in a number of ways. For example, the chains may be driven from the axle of the cotton harvester vehicle. Similarly, the chains may be driven through appropriate gearing (not shown) by a shaft 118 bearing a wheel 119 adapted to engage and travel along the ground.

The laterally extending spindles on chains 113, 114, 116 and 117 may be readily replaceable. To further protect the cotton plants, the spindles may be made of resilient material, or made of metal or the like coated with rubber, plastic or similar material.

Modifications may be made in the invention without departing from the spirit of it. For example, it is within the skill of the worker in the art to substitute simplified manifold means for the various flexible intake and outlet hose or conduit means. It is preferred that the outlet ports in the diaphragm chamber halves be located at the bottoms thereof to insure complete discharge of the material within the chamber halves. As indicated above, the number of inlet and outlet ports in the diaphragm chamber halves may be varied, so long as the free area of the outlet ports is equal to or greater than the free area of the inlet ports. Finally, the placement and attachment of the valves 57 may be varied depending upon the nature of the inlet and outlet ports of the diaphragm chambers and the intake and outlet conduits.

The embodiments of the invention in which an exclusive property or privilege is claimed are defined as follows:

1. A pneumatic cotton harvester comprising a pair of spaced means positioned to lie on either side of a cotton plant in a row thereof and each having a plurality of cotton intake openings therein, a pump having at least one inlet opening and at least one outlet opening, the free area of said at least one outlet opening being at least equal to the free area of said at least one inlet opening, conduit means connecting said cotton intake openings to said at least one pump inlet opening, cotton receiving means, conduit means connecting said at least one pump outlet opening with said cotton receiving means, means for permitting the passage of air and cotton through said cotton intake openings, said at least one pump inlet opening and said conduit means therebetween only in a direction toward said pump, means for permitting the passage of air and cotton from said pump only through said at least one pump outlet opening and said conduit means connected thereto to said cotton receiving means, means to advance said cotton harvester along said row of cotton plants and means to actuate said pump to continuously produce alternate vacuum and pressure pulses whereby during a vacuum pulse cotton will be drawn from said plant to said pump through said cotton intake openings, said at least one pump inlet opening and said conduit therebetween and during a pressure pulse cotton within said pump will be expelled through said at least one pump outlet opening and said conduit connected thereto to said cotton receiving means.

2. The structure claimed in claim 1 where said alternate vacuum and pressure pulses have an air velocity of from about one half the speed of sound to about the speed of sound.

3. The structure claimed in claim 1 wherein said pair of spaced means each comprises a panel, each of said panels having said cotton inlet openings therein arranged in at least one vertical row.

4. The structure claimed in claim 1 wherein said pump has more than one inlet opening and more than one outlet opening, the free area of said outlet openings being at least equal to the free area of said inlet openings.

5. The structure claimed in claim 1 wherein said means to advance said cotton harvester along said row of cotton plants comprises a self propelled vehicle.

6. The structure claimed in claim 1 wherein said means permitting the passage of air and cotton only in a direction toward said pump comprises a one way valve in association with said at least one pump inlet opening and said means to permit passage of air and cotton from said pump only to said cotton receiving means comprising a one way valve in association with said at least one pump outlet opening.

7. The structure claimed in claim 1 wherein said pump comprises at least one diaphragm chamber, a diaphragm dividing said chamber into first and second halves, each of said chamber halves having at least one inlet opening and at least one outlet opening, conduit means connecting said at least one inlet opening of said first chamber half to selected ones of said cotton intake openings, conduit means connecting said at least one inlet opening of said second chamber half to the remainder of said cotton intake openings, conduit means connecting said at least one outlet opening of said first and second chamber halves to said cotton receiving means, means to permit the passage of air and cotton through said cotton intake openings and their respective conduit means and chamber half inlet openings only in a direction toward said respective chamber halves, and means to permit the passage of air and cotton from said chamber halves only through their respective outlet openings and connected conduit means to said cotton receiving means, means to reciprocate said diaphragm transversely of said diaphragm chamber to produce alternately a vacuum pulse in said first chamber half with a simultaneous pressure pulse in said second chamber half and a pressure pulse in said first chamber half with a simultaneous vacuum pulse in said second chamber half, whereby cotton is drawn from said plant into each chamber half when said chamber half is subjected to a vacuum pulse and cotton is expelled from each chamber half to said cotton receiving means when said chamber half is subjected to a pressure pulse.

8. The structure claimed in claim 3 wherein said panels are adjustable vertically and toward and away from each other.

9. The structure claimed in claim 3 wherein said cotton intake openings of said vertical rows on said panels are staggered in vertical position with respect to each other.

10. The structure claimed in claim 3 wherein each panel has at least two vertical rows of said cotton intake openings.

11. The structure claimed in claim 3 wherein each of said cotton intake openings tapers inwardly to a portion of lesser diameter whereby to provide a Venturi effect.

12. The structure claimed in claim 3 including means to maintain said cotton plant upright as it passes between said panels.

13. The structure claimed in claim 6 wherein said means permitting the passage of air and cotton only in a direction toward said pump also comprises a one way valve in association with each of said cotton intake openings.

14. The structure claimed in claim 6 wherein each of said one way valves comprises a resilient member having a cylindrical body affixed at one end to its respective inlet or outlet opening and terminating at the other end in a pair of converging flats with an elongated narrow opening therebetween capable of being distorted to permit the passage of air and cotton therethrough when subjected to a pressure pulse and closing when subjected to a vacuum pulse.

15. The structure claimed in claim 10 wherein said intake openings in each of said vertical rows of each of said panels are vertically staggered with respect to said intake openings in the adjacent row on the same panel.

16. The structure claimed in claim 7 wherein said alternate vacuum and pressure pulses have an air velocity of from about one half the speed of sound to about the speed of sound.

17. The structure claimed in claim 7 wherein said pair of spaced means each comprises a panel, each of said panels having said cotton inlet openings therein arranged in at least one vertical row.

18. The structure claimed in claim 7 wherein each of said chamber halves has more than one inlet openings and more than one outlet opening, the free area of said outlet openings of each chamber half being at least equal to the free area of said inlet openings of said chamber half.

19. The structure claimed in claim 7 wherein said means to advance said cotton harvester along said row of cotton plants comprises a self propelled vehicle.

20. The structure claimed in claim 7 wherein said means to permit the passage of air and cotton through said cotton intake openings and their respective conduit means and chamber half inlet openings only in a direction toward said respective chamber halves comprises one way valves in association with said chamber half inlet openings and said means to permit the passage of air and cotton from said chamber halves only through their respective outlet openings and connected conduit means to said cotton receiving means comprise one way valves in association with said chamber half outlet openings.

21. The structure claimed in claim 7 wherein said pump comprises at least two of said diaphragm chambers, conduit means connecting said inlet openings of said chamber halves of both chambers to selected ones of said cotton intake openings, conduit means connecting said outlet openings of said chamber halves of both chambers to said cotton receiving means.

22. The structure claimed in claim 7 wherein said means to permit the passage of air and cotton through said cotton intake openings and their respective conduit means and chamber half inlet openings only in a direction toward said respective chamber halves comprise one way valves in association with each of said cotton intake openings.

23. The structure claimed in claim 12 wherein said means to maintain said cotton plant upright comprises a plurality of plant-engaging spindles and means to cause said spindles to move along said panels in the same direction as said cotton plant and at the same speed as said cotton plant.

24. The structure claimed in claim 13 wherein each of said one way valves comprises a resilient member having a cylindrical body affixed at one end to its respective inlet or outlet opening and terminating at the other end in a pair of converging flats with an elongated narrow opening therebetween capable of being distorted to permit the passage of air and cotton therethrough when subjected to a pressure pulse and closing when subjected to a vacuum pulse.

25. The structure claimed in claim 17 wherein said panels are adjustable vertically and toward and away from each other.

26. The structure claimed in claim 17 wherein said cotton intake openings of said vertical rows on said panels are staggered in vertical positions with respect to each other.

27. The structure claimed in claim 17 wherein each panel has at least two vertical rows of said cotton intake openings.

28. The structure claimed in claim 20 wherein each of said one way valves comprises a resilient member having a cylindrical body affixed at one end to its respective inlet or outlet opening and terminating at the other end in a pair of converging flats with an elongated narrow opening therebetween capable of being distorted to permit the passage of air and cotton therethrough when subjected to a pressure pulse and closing when subjected to a vacuum pulse.

29. The structure claimed in claim 21 wherein said means to actuate said pump comprises a crankshaft, link means connecting the centers of said diaphragms of both diaphragm chambers to said crankshaft and means to rotate said crankshaft whereby to reciprocate said diaphragms transversely of their respective chambers.

30. The structure claimed in claim 22 wherein each of said one way valves comprises a resilient member having a cylindrical body affixed at one end to its respective inlet opening and terminating at the other end in a pair of converging flats with an elongated narrow opening therebetween capable of being distorted to permit the passage of air and cotton therethrough when subjected to a pressure pulse and closing when subjected to a vacuum pulse.

31. The structure claimed in claim 27 wherein said intake openings in each of said vertical rows of each of said panels are vertically staggered with respect to said intake openings in the adjacent row on the same panel.

* * * * *